United States Patent
Kawasaki et al.

(10) Patent No.: US 8,344,067 B2
(45) Date of Patent: Jan. 1, 2013

(54) RUBBER COMPOSITION AND USES THEREOF

(75) Inventors: Kuniyoshi Kawasaki, Fujisawa (JP); Hiroyuki Sano, Fujisawa (JP)

(73) Assignee: NOK Corporation, Tokyo (JP)

( * ) Notice: Subject to any disclaimer, the term of this patent is extended or adjusted under 35 U.S.C. 154(b) by 78 days.

(21) Appl. No.: 12/935,577

(22) PCT Filed: Mar. 31, 2008

(86) PCT No.: PCT/JP2008/056295
§ 371 (c)(1),
(2), (4) Date: Sep. 29, 2010

(87) PCT Pub. No.: WO2009/122481
PCT Pub. Date: Oct. 8, 2009

(65) Prior Publication Data
US 2011/0040037 A1    Feb. 17, 2011

(51) Int. Cl.
*C08L 47/00* (2006.01)
*C08L 83/05* (2006.01)
(52) U.S. Cl. ......................................... 525/105; 525/100
(58) Field of Classification Search .................. None
See application file for complete search history.

(56) References Cited

U.S. PATENT DOCUMENTS

| | | | |
|---|---|---|---|
| 5,610,254 A | 3/1997 | Sagane et al. | |
| 5,696,214 A | 12/1997 | Sagane et al. | |
| 5,807,948 A | 9/1998 | Sagane et al. | |
| 5,922,823 A | 7/1999 | Sagane et al. | |
| 6,320,010 B1 | 11/2001 | Sakaguchi et al. | |
| 6,864,315 B1 | 3/2005 | Hakuta et al. | |
| 7,741,394 B2 * | 6/2010 | Hakuta et al. | 524/266 |
| 2005/0020740 A1 | 1/2005 | Matsunaga et al. | |
| 2009/0152488 A1 | 6/2009 | Adler et al. | |
| 2011/0054106 A1 * | 3/2011 | Sano | 524/451 |
| 2011/0092631 A1 * | 4/2011 | Hasegawa | 524/493 |

FOREIGN PATENT DOCUMENTS

| | | |
|---|---|---|
| EP | 1 293 534 A1 | 3/2003 |
| EP | 1 605 015 A1 | 12/2005 |
| JP | 2961068 | 10/1996 |
| JP | 9-71617 | 3/1997 |
| JP | 9-71618 | 3/1997 |
| JP | 9-208615 | 8/1997 |
| JP | 10-067823 | 3/1998 |
| JP | 10-067824 | 3/1998 |
| JP | 10-110054 | 4/1998 |
| JP | 11-35635 | 2/1999 |
| JP | 11-323030 | 11/1999 |
| JP | 2000-309709 | 7/2000 |
| JP | 2004-204181 | 7/2004 |
| WO | WO 00/43447 | 7/2000 |
| WO | WO 03/057777 A1 | 7/2003 |
| WO | WO 2007/004481 * | 1/2007 |
| WO | WO 2007/033790 A2 | 3/2007 |

OTHER PUBLICATIONS

Abstract for JP 2006-290914 (Oct. 2006).*
Machine-generated translation for JP 2006-290914 (Oct. 2006).*
International Search Report for International Patent Application No. PCT/JP2008/056295, mailed Jun. 17, 2008, 2 pgs.
"Polymer Production Process,", Kogyo Chosakai Publishing Inc., 1994, pp. 365-378.
Extended European Search Report EP 08739409.4 dated Aug. 10, 2012.

* cited by examiner

*Primary Examiner* — Marc Zimmer
(74) *Attorney, Agent, or Firm* — Foley & Lardner LLP (57) ABSTRACT

It is an object of the present invention to provide a rubber composition having: excellent sealing properties, heat resistance and acid resistance; a low reaction force, low hardness and low compression set; and excellent low-temperature recovery properties that contribute to sealing properties particularly in low-temperature environment. It is another object of the invention to provide uses of the rubber composition and main bodies on which the rubber composition has been mounted. The rubber composition of the present invention comprises a specific ethylene/α-olefin/non-conjugated polyene copolymer [A], a SiH group-containing compound [B] having two SiH groups in one molecule, and a SiH group-containing compound [C] having three SiH groups in one molecule.

14 Claims, 1 Drawing Sheet

RUBBER COMPOSITION AND USES THEREOF

TECHNICAL FIELD

The present invention relates to a rubber composition and uses thereof. More particularly, the present invention relates to a rubber composition which can be favorably used for a fuel cell sealing member, various gasket members such as a gasket member for LIM molding, a sealing member for an electric wire connector, etc., and also relates to a fuel cell sealing member, a hard disk drive top cover gasket, a gasket member for LIM molding and a sealing member for an electric wire connector each of which is obtained from the rubber composition, and main bodies comprising any of these members mounted thereon.

BACKGROUND ART

Sealing parts and gasket parts used in electrical appliances are essentially required to be excellent in barrier properties, sealing properties, etc., to satisfy desired hardness, to have high heat resistance so as to be able to withstand heat generated during application of electric current and to be employable also in low-temperature environment.

For example, for cell sealing members for fuel cells and the like, low-cost materials excellent in heat resistance, acid resistance, gas permeation resistance and high-speed moldability have been desired. In the existing circumstances, a fluororubber has been adopted from the viewpoints of heat resistance and acid resistance, a butyl rubber has been adopted from the viewpoint of gas permeation resistance, and a silicone rubber has been adopted from the viewpoints of heat resistance and moldability. However, when the high-speed moldability is required, usual materials are insufficient to meet the requirement, and studies have thus been made on, for example, a method in which a liquid silicone rubber is used and liquid injection molding (LIM) is applied. The silicone rubber is excellent in heat resistance and high-speed moldability, but it cannot be said that the silicone rubber is satisfactory in acid resistance and gas permeation resistance.

With minimization of size and increase in performance of electronic equipments, decrease in size and thickness of their components has been desired. However, when the size of the components is decreased, assembly workability in manufacturing is deteriorated. Therefore, integration and combination of various components have been desired.

For example, a gasket for a hard disk drive that is an electronic memory device is sometimes used in such a form that a simple rubber or a urethane foam sheet is interposed between metal covers such as stainless steel covers or aluminum covers and they are bonded with an adhesive and thereby integrated and then used. However, simultaneously with the integration, decrease in weight and thickness of the metal covers is carried out, and therefore, if the hardness (reaction force) of the gasket is high, a problem of deformation of the covers takes place.

Under such circumstances, a styrene-based thermoplastic elastomer has been disclosed for a gasket member (Patent document 1). This document describes that the styrene-based thermoplastic elastomer has low hardness and does not need a vulcanization process differently from rubber materials, which enables simplification of the production process and recycling of the elastomer.

However, the elastomer tends to be exposed to higher temperatures (particularly not lower than 80° C.) in the use environment because of generation of heat due to increase in performance (high rotational speed) of hard disk drives and adoption of the elastomer in automobiles. In such environment, the conventional styrene-based thermoplastic elastomer has a problem of permanent set at high temperatures, which is one of mechanical properties of the elastomer, and there is a limitation on the performance of the elastomer.

Electric wire connectors have functions of connecting and branching electric wires, and comprise a pair of male and female resin frames that can be connected to each other through one-touch operation, an electric wire and a sealing member. The sealing member is mainly used as a dust seal between the electric wire and the resin frame. The sealing member used in this type of the electric wire connector requires sealing properties and insertion properties for thin electric wires, and a silicone rubber and a nitrile rubber which have low hardness and which are oil-bleeding type rubbers have been used in the past. These rubbers, however, mainly contain silicone oil as a plasticizer, and the plasticizer adheres to electrical contact points during the use, resulting in occurrence of troubles in the flow of electric current due to insulation at the electrical contact points.

Under such circumstances, Patent document 2 has proposed a rubber composition, which is excellent in high-speed moldability, heat resistance, acid resistance and gas permeation resistance and which is favorably used for a fuel cell sealing member, a gasket member for an electronic device such as a hard disk drive, a sealing member for an electric wire connector, etc. This rubber composition is a liquid rubber composition which can be applied to LIM molding, and which can provide molded products of low hardness. Therefore, this rubber composition is suitable for a sealing member for a fuel cell, a gasket member for a hard disk drive, etc. for which sealing properties with low reaction force are required even under high compression. Such a rubber composition, however, is inferior to a silicone rubber and the like inelastic recovery rate in low-temperature environment, and therefore, further improvement in mechanical properties in low-temperature environment has been desired.

Patent document 1: Japanese Patent No. 2961068
Patent document 2: International Publication WO03/057777

DISCLOSURE OF THE INVENTION

Problem to be Solved by the Invention

It is an object of the present invention to provide a rubber composition which has: excellent sealing properties, heat resistance and acid resistance; low reaction force, low hardness and low compression set; and excellent low-temperature recover properties that contribute to sealing properties particularly in low-temperature environment. It is another object of the present invention to provide uses of the rubber composition and main bodies on which the rubber composition has been mounted.

Means to Solve the Problem

The rubber composition of the present invention comprises:
an ethylene/α-olefin/non-conjugated polyene copolymer [A] satisfying the following (a) to (e), preferably satisfying the following (a) to (f):
(a) said copolymer is a copolymer of ethylene, an α-olefin and a non-conjugated polyene,
(b) the α-olefin has 3 to 20 carbon atoms,
(c) the weight ratio of ethylene units to α-olefin units is in the range of 35/65 to 95/5,

(d) the iodine value is in the range of 0.5 to 50,
(e) the intrinsic viscosity [η] is in the range of 0.01 to 5.0 dl/g as measured in decalin at 135° C., and
(f) the non-conjugated polyene is at least one kind of norbornene compound represented by the following general formula [I],
a SiH group-containing compound [B] represented by the following general formula [II] and having two SiH groups in one molecule, and
a SiH group-containing compound [C] represented by the following general formula [III] and having three SiH groups in one molecule;

[I]

wherein n is an integer of 0 to 10, $R^1$ is a hydrogen atom or an alkyl group of 1 to 10 carbon atoms, and $R^2$ is a hydrogen atom or an alkyl group of 1 to 5 carbon atoms,

[II]

wherein each $R^3$ is a monovalent group of 1 to 10 carbon atoms, is an unsubstituted or substituted saturated hydrocarbon group or an aromatic hydrocarbon group and may be the same or different in one molecule, a is an integer of 0 to 20, b is an integer of 0 to 20, and $R^4$ is a divalent organic group of 1 to 30 carbon atoms or an oxygen atom,

[III]

wherein each $R^5$ is a monovalent group of 1 to 10 carbon atoms, is an unsubstituted or substituted saturated hydrocarbon group or an aromatic hydrocarbon group and may be the same or different in one molecule, a, b and c are each independently an integer of 0 to 20, and $R^6$ is a trivalent organic group of 1 to 30 carbon atoms.

The rubber composition of the present invention preferably contains the SiH group-containing compound [C] having three SiH groups in one molecule in an amount of 0.1 to 2 parts by weight based on 100 parts by weigh of the ethylene/α-olefin/non-conjugated polyene copolymer [A].

In the rubber composition of the present invention, the SiH group-containing compound [C] having three SiH groups in one molecule is preferably a compound represented by the following formula [III-1]:

[III-1]

In the rubber composition of the present invention, the SiH group-containing compound [B] is preferably a compound represented by the following formula [II-1]:

[II-1]

The fuel cell sealing member of the present invention comprises the rubber composition of the present invention.

The fuel cell of the present invention comprises a fuel cell sealing member comprising the rubber composition of the present invention.

The hard disk drive top cover gasket of the present invention and the gasket member for LIM molding of the present invention comprise the rubber composition of the present invention.

The hard disk drive of the present invention comprises a hard disk drive top cover gasket comprising the rubber composition of the present invention.

The sealing member for an electric wire connector of the present invention comprises the rubber composition of the present invention.

The sealing member for an electric wire connector of the present invention comprises an electric wire connector sealing member comprising the rubber composition of the present invention. The electric wire connector of the invention is preferably an electric wire connector for automobiles.

Effect of the Invention

The rubber composition of the present invention is suitable for LIM molding, and molded articles produced by using the rubber composition has: excellent sealing properties, heat resistance and acid resistance; low reaction force, low hardness and low compression set; and excellent low-temperature recovery properties that contribute to sealing properties particularly in low-temperature environment. The rubber composition of the present invention does not cause oil bleeding, blooming or the like, and provides molded articles excellent in mechanical properties and resistance to outgassing. When the rubber composition is molded into a connector seal for an electric wire, the seal has excellent sealing properties and insertion properties for electric wires, and the rubber composition is suitable for a fuel cell sealing member, a gasket member for LIM molding and a sealing member for an electric wire connector. The fuel cell, the hard disk drive top cover gasket, the hard disk drive, the electric wire connector, etc. of the present invention are each provided with a molded product comprising the rubber composition of the present invention, and the molded product has excellent sealing properties, heat resistance and acid resistance, has low reaction force, low hardness and low compression set, has excellent low-temperature recover properties and can be favorably applied to any of use in low-temperature environment and use under the conditions of high temperatures due to generation of heat.

DESCRIPTION OF REFERENCE NUMERALS

1: carbon, metallic or resin separator of separator-integrated cell for fuel cell
2: space
3: seal part of cell

BEST MODE FOR CARRYING OUT THE INVENTION

The present invention is described in detail hereinafter.
Rubber Composition
The rubber composition according to the present invention comprises, as essential components, an ethylene/α-olefin/non-conjugated polyene copolymer [A], a SiH group-containing compound [B] having two SiH groups in one molecule, and a SiH group-containing compound [C] having three SiH groups in one molecule.
[A] Ethylene/α-Olefin/Non-Conjugated Polyene Copolymer
The copolymer [A] for use in the present invention at least satisfies the following (a) to (e), and preferably satisfies the following (a) to (f):
(a) said copolymer is a copolymer of ethylene, an α-olefin and a non-conjugated polyene,
(b) the α-olefin has 3 to 20 carbon atoms,
(c) the weight ratio of ethylene units to α-olefin units is in the range of 35/65 to 95/5,
(d) the iodine value is in the range of 0.5 to 50,
(e) the intrinsic viscosity [η] is in the range of 0.01 to 5.0 dl/g as measured in decalin at 135° C., and
(f) the non-conjugated polyene is at least one kind of norbornene compound represented by the following formula [I].

The copolymer [A] according to the present invention is a copolymer of ethylene, an α-olefin of 3 to 20 carbon atoms and a non-conjugated polyene, and is preferably a random copolymer thereof.
α-Olefin
The α-olefin to constitute the copolymer [A] is an α-olefin of 3 to 20 carbon atoms. Examples of the α-olefins include propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene and 12-ethyl-1-tetradecene. Of these, α-olefins of 3 to 10 carbon atoms are more preferable, and in particular, propylene, 1-butene, 1-hexene or 1-octene is most preferably used. These α-olefins are used singly or in combination of two or more kinds.

Non-Conjugated Polyene
Although the non-conjugated polyene to constitute the copolymer [A] is not specifically restricted, it is preferably a non-conjugated diene, more preferably at least one kind of norbornene compound represented by the following general formula [I].

In the formula [I], n is an integer of 0 to 10, $R^1$ is a hydrogen atom or an alkyl group of 1 to 10 carbon atoms, and $R^2$ is a hydrogen atom or an alkyl group of 1 to 5 carbon atoms.
Examples of the norbornene compounds represented by the general formula [I] include 5-vinyl-2-norbornene, 5-(2-propenyl)-2-norbornene, 5-(3-butenyl)-2-norbornene, 5-(1-methyl-2-propenyl)-2-norbornene, 5-(4-pentenyl)-2-norbornene, 5-(1-methyl-3-butenyl)-2-norbornene, 5-(5-hexenyl)-2-norbornene, 5-(1-methyl-4-pentenyl)-2-norbornene, 5-(2,3-dimethyl-3-butenyl)-2-norbornene, 5-(2-ethyl-3-butenyl)-2-norbornene, 5-(6-heptenyl)-2-norbornene, 5-(3-methyl-5-hexenyl)-2-norbornene, 5-(3,4-dimethyl-4-pentenyl)-2-norbornene, 5-(3-ethyl-4-pentenyl)-2-norbornene, 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene and 5-(1,2,3-trimethyl-4-pentenyl)-2-norbornene.
Of these, 5-vinyl-2-norbornene, 5-(2-propenyl)-2-norbornene, 5-(3-butenyl)-2-norbornene, 5-(4-pentenyl)-2-norbornene, 5-(5-hexenyl)-2-norbornene, 5-(6-heptenyl)-2-norbornene and 5-(7-octenyl)-2-norbornene are preferable. These norbornene compounds may be used singly or in combination of two or more kinds.
The non-conjugated polyene to constitute the copolymer [A] of the present invention may be a non-conjugated polyene other than the norbornene compound represented by the general formula [I]. The non-conjugated polyene employable is not specifically restricted, and the following linear non-conjugated dienes, alicyclic non-conjugated dienes and triene compounds may be mentioned. These non-conjugated polyenes may be used singly or in combination of two or more kinds. The non-conjugated polyene other than the norbornene compound represented by the general formula [I] may be used together with the norbornene compound represented by the general formula [I].
Examples of the linear non-conjugated dienes include 1,4-hexadiene, 3-methyl-1,4-hexadiene, 4-methyl-1,4-hexadiene, 5-methyl-1,4-hexadiene, 4,5-dimethyl-1,4-hexadiene and 7-methyl-1,6-octadiene.
Example of the cyclic non-conjugated dienes include 5-methylene-2-norbornene, 1-methyl-5-methylene-2-norbornene, 1-ethyl-5-methylene-2-norbornene, 5-ethylidene-2-norbornene, 5-isopropylidene-2-norbornene, 5-vinylidene-2-norbornene, 6-chloromethyl-5-isopropenyl-2-norbornene, dicyclopentadiene and methyltetrahydroindene.
Examples of the non-conjugated polyenes other than the above compounds include trienes, such as 2,3-diisopropylidene-5-norbornene, 2-ethylidene-3-isopropylidene-5-norbornene and 2-propenyl-2,2-norbornadiene.

Composition and Properties of Copolymer [A]

The copolymer [A] according to the present invention has a ratio of ethylene units to α-olefin units of in the range of 35/65 to 95/5, preferably 40/60 to 90/10, more preferably 45/55 to 85/15, particularly preferably 50/50 to 80/20, in terms of weight ratio.

When the weight ratio is in the above range, a rubber composition capable of providing crosslinked rubber molded products which are excellent not only in heat aging resistance, strength properties and rubber elasticity but also in cold resistance and processability is obtained.

The iodine value of the copolymer [A] of the present invention is in the range of 0.5 to 50 (g/100 g), preferably 1 to 45, more preferably 1 to 43, particularly preferably 3 to 40 (g/100 g).

When the iodine value is in the above range, a rubber composition having high crosslinking efficiency is obtained. The rubber composition is capable of providing crosslinked rubber molded products which are excellent not only in resistance to compression set but also in resistance to environmental degradation (heat aging resistance). If the iodine value exceeds the upper limit of the above range, the crosslink density sometimes becomes too high to thereby lower mechanical properties such as tensile elongation.

The intrinsic viscosity [η] of the copolymer [A] according to the present invention is in the range of 0.01 to 5.0 dl/g, preferably 0.03 to 4.0 dl/g, more preferably 0.05 to 3.5 dl/g, particularly preferably 0.07 to 3.0 dl/g as measured in decalin at 135° C. An embodiment wherein the intrinsic viscosity [η] of the copolymer [A] is not more than 0.5 dl/g, preferably less than 0.3 dl/g, is preferable especially when the rubber composition is subjected to LIM molding. When the intrinsic viscosity [η] is in the above range, a rubber composition capable of providing crosslinked rubber molded products which are excellent not only in strength properties and resistance to compression set but also in processability is obtained.

The copolymer [A] according to the present invention desirably has a low viscosity, that is, desirably has a complex viscosity (25° C., strain: 1%) of not more than $10^5$ Pa·S, preferably not more than 4000 Pa·S, more preferably not more than 2000 Pa·S as measured by the use of a viscoelasticity measuring device MCR301 manufactured by Anton Paar (Australia).

Process for Preparing Copolymer [A]

The copolymer [A] according to the present invention can be prepared by copolymerizing ethylene, an α-olefin and a non-conjugated polyene such as the aforesaid norbornene compound represented by the formula [I] in the presence of a polymerization catalyst. Specifically, the copolymer can be more preferably prepared such hitherto publicly known processes as described in, for example, "Polymer Production Process" (Published by Kogyo Chosakai Publishing Co., Ltd., pp. 365-378), Japanese Patent Laid-Open Publication No. 71617/1997, Japanese Patent Laid-Open Publication No. 71618/1997, Japanese Patent Laid-Open Publication No. 208615/1997, Japanese Patent Laid-Open Publication No. 67823/1998, Japanese Patent Laid-Open Publication No. 67824/1998 and Japanese Patent Laid-Open Publication No. 110054/1998.

The polymerization catalysts preferably used include: a Ziegler catalyst comprising a compound of a transition metal, such as vanadium (V), zirconium (Zr) or titanium (Ti), and an organoaluminum compound (organoaluminum oxy-compound); and a metallocene catalyst comprising a transition metal compound of a transition metal selected from group IVB of the periodic table of elements and either an organoaluminum oxy-compound or an ionizing ionic compound.

Specifically, the copolymer [A] according to the present invention can be preferably prepared by copolymerizing ethylene, an α-olefin and the aforesaid non-conjugated polyene, particularly preferably a norbornene compound containing a vinyl group, in the presence of a catalyst containing, as main components, a vanadium compound (a) and an organoaluminum compound (b) described below, under the conditions of a polymerization temperature of 30 to 60° C., particularly preferably 30 to 50° C., a polymerization pressure of 4 to 12 kgf/cm², particularly preferably 5 to 8 kgf/cm², and a molar ratio of the amount of non-conjugated polyene fed to the amount of ethylene fed (non-conjugated polyene/ethylene) ranging from 0.01 to 0.2. The copolymerization is preferably carried out in a hydrocarbon medium.

The vanadium compound (a) is, for example, a vanadium compound represented by the general formula $VO(OR)_aX_b$ or $V(OR)_cX_d$ (wherein R is a hydrocarbon group, $0 \leq a \leq 3$, $0 \leq b \leq 3$, $2 \leq a+b \leq 3$, $0 \leq c \leq 4$, $0 \leq d \leq 4$ and $3 \leq c+d \leq 4$) or an electron donor adduct thereof.

More specifically, there may be mentioned, for example, $VOCl_3$, $VO(OC_2H_5)Cl_2$, $VO(OC_2H_5)_2Cl$, $VO(O\text{-iso-}C_3H_7)Cl_2$, $VO(O\text{-n-}C_4H_9)Cl_2$, $VO(OC_2H_5)_3$, $VOBr_3$, $VCl_4$, $VOCl_3$, $VO(O\text{-n-}C_4H_9)_3$ and $VCl_3 \cdot 2OC_6H_{12}OH$.

Examples of the organoaluminum compounds (b) include trialkylaluminums, such as triethylaluminum, tributylaluminum and triisopropylaluminum; dialkylaluminum alkoxides, such as diethylaluminumethoxide and dibutylaluminumbutoxide; alkylaluminum sesquialkoxides, such as ethylaluminum sesquiethoxide and butylaluminum sesquibutoxide;

partially alkoxylated alkylaluminums having an average composition represented by $R_{0.5}Al(OR)_{0.5}$ or the like; partially halogenated alkylaluminums, e.g., dialkylaluminum halides, such as diethylaluminum chloride, dibutylaluminum chloride and diethylaluminum bromide, alkylaluminum sesquihalides, such as ethylaluminum sesquichloride, butylaluminum sesquichloride and ethylaluminum sesquibromide, and alkylaluminum dihalides, such as ethylaluminum dichloride, propylaluminum dichloride and butylaluminumdibromide; partially hydrogenated alkylaluminums, e.g., dialkylaluminum hydrides, such as diethylaluminum hydride and dibutylaluminum hydride, and alkylaluminum dihydrides, such as ethylaluminum dihydride and propylaluminum dihydride; and partially alkoxylated and halogenated alkylaluminums, such as ethylaluminum ethoxychloride, butylaluminum butoxychloride and ethylaluminum ethoxybromide.

Other Resin Components

The resin component contained in the rubber composition according to the present invention is preferably only the aforesaid ethylene/α-olefin/non-conjugated polyene copolymer [A]. However, a resin component other than the ethylene/α-olefin/non-conjugated polyene copolymer [A] may be contained in the composition within limits not detrimental to the objects of the present invention.

The resin component other than the copolymer [A] preferably used as an arbitrary component is, for example, an organopolysiloxane The organopolysiloxane has a function of improving heat aging resistance of the rubber composition and contributes to improvement in heat aging resistance of fuel cell sealing parts, hard disk top cover gaskets, and sealing members for electric wire connectors.

When the rubber composition of the present invention contains the organopolysiloxane, the organopolysiloxane is contained in such an amount that the weight ratio of the ethylene/α-olefin/non-conjugated polyene copolymer:organopolysiloxane is preferably in the range of 99.9:0.1 to 5:95, more preferably 99.9:0.1 to 60:40, still more preferably 99.9:0.1 to 70:30.

The organopolysiloxane is, for example, a compound having an average composition formula represented by the following formula (S):

$$R^1{}_t SiO_{(4-t)/2} \quad (S)$$

In the formula (S), $R^1$ is a monovalent hydrocarbon group of 1 to 10 carbon atoms, a part of or all of hydrogen atoms of the group may be replaced with cyano groups or halogen groups, and t is a number of 1.9 to 2.1.

$R^1$ in the above formula (S) is specifically an alkyl group, such as methyl group, ethyl group, propyl group, butyl group, hexyl group or octyl group, a cycloalkyl group, such as cyclopentyl group or cyclohexyl group, an alkenyl group, such as vinyl group, allyl group or propenyl group, a cycloalkenyl group, such as cyclopentenyl group or cyclohexenyl group, an aryl group, such as phenyl group, tolyl group or xylyl group, or an aralkyl group, such as benzyl group or phenylethyl group. In these groups, a part of or all of hydrogen atoms may be replaced with chlorine atoms, fluorine atoms or cyano groups.

Particularly preferable organopolysiloxanes include an organopolysiloxane having a dimethylsiloxane unit in its main chain, and an organopolysiloxane in which a diphenylsiloxane unit having a phenyl group, a methylvinylcycloxane unit having a vinyl group, a methyl-3,3,3-trifluoropropylsiloxane unit having a 3,3,3-trifluoropropyl group, or the like is introduced into a part of a main chain of dimethylpolysiloxane.

The organopolysiloxane preferably has two or more aliphatic unsaturated groups, such as alkenyl groups and cycloalkenyl groups, in one molecule, and the amount of the aliphatic unsaturated groups, particularly preferably vinyl groups, in $R^1$ is in the range of preferably 0.01 to 20% by mol, particularly preferably 0.02 to 10% by mol. The aliphatic unsaturated group may be present at the end of the molecular chain, at a halfway position of the molecular chain or at both thereof, it is preferably present at least at the end of the molecular chain. The end of the molecular chain may be capped with a trimethylsilyl group, a dimethylphenylsilyl group, a dimethylhydroxysilyl group, a dimethylvinylsilyl group, a trivinylsilyl group or the like.

Examples of the organopolysiloxanes particularly preferably employable in the present invention include methylvinylpolysiloxane, methylphenylvinylpolysiloxane and methyltrifluoropropylvinylpolysiloxane.

The organopolysiloxane may be obtained by, for example, subjecting one or more kinds of organohalogenosilanes to (co)hydrolysis condensation or by subjecting a cyclic polysiloxane (e.g., trimer or tetramer of siloxane) to ring-opening polymerization using an alkaline or acid catalyst. The organopolysiloxane is basically a linear diorganopolysiloxane, but it may be a mixture of two or more kinds of organopolysiloxanes having different molecular structures.

The organopolysiloxane is available as a commercial product or can be synthesized by a publicly known process disclosed.

The degree of polymerization of the organopolysiloxane is preferably not less than 100, particularly preferably 3,000 to 20,000. The viscosity of the organopolysiloxane at 25° C. is preferably not less than 100 centistokes (cSt), particularly preferably 100,000 to 100,000,000 cSt.

[B] SiH Group-Containing Compound Having Two SiH Groups in One Molecule

The SiH group-containing compound [B] having two SiH groups in one molecule for use in the present invention is a compound represented by the following general formula [II].

In the formula (II), each $R^3$ is a monovalent group of 1 to 10 carbon atoms, is an unsubstituted or substituted saturated hydrocarbon group or an aromatic hydrocarbon group and may be the same or different in one molecule. a is an integer of 0 to 20, b is an integer of 0 to 20, and $R^4$ is a divalent organic group of 1 to 30 carbon atoms or an oxygen atom.

Such a SiH group-containing compound [B] having two SiH groups in one molecule is characterized by having SiH groups at the both ends of a molecule and having two SiH groups per molecule. Examples of $R^3$ in the general formula [II] include methyl group, ethyl group, propyl group, isopropyl group, butyl group, amyl group, cyclopentyl group, hexyl group, cyclohexyl group, octyl group, chloromethyl group, 2-chloroethyl group, 3-chloropropyl group, phenyl group, phenylmethyl group, 2-phenylethyl group and 2-phenylpropyl group. Preferable are methyl group, ethyl group and phenyl group. a is an integer of 0 to 20, and b is an integer of 0 to 20. a and b are each preferably not more than 10, more preferably not more than 5, particularly preferably not more than 2, and it is most preferable that a and b are equal to each other and are each not more than 2.

Examples of the SiH group-containing compounds [B] represented by the general formula [II] and having two SiH groups in one molecule are given below. $R^4$ in the general formula [II] is a divalent organic group of 1 to 30 carbon atoms or an oxygen atom, and examples of the divalent organic groups correspond to divalent groups in the compounds specifically exemplified below. These SiH group-containing compounds [B] may be used singly or as a mixture of two or more kinds of the compounds. The SiH group-containing compound [B] may be synthesized by a publicly known process disclosed.

-continued

Of these, the SiH group-containing compound [B] having two SiH groups in one molecule, which is particularly preferably used in the present invention, is a compound represented by the following formula [II-1].

[II-1]

The use of the compound as the component [B] provides a fuel cell sealing member, a hard disk drive top cover gasket and a sealing member for an electric wire connector each of which is enhanced in mechanical properties while maintaining the conventional various excellent properties and thereby exhibits most excellent properties.

The SiH group-containing compound [B] having two SiH groups in one molecule is preferably contained in the rubber composition in such an amount as to give 0.2 to 10 hydrogen atoms bonded to silicon atoms based on one aliphatic unsaturated bond contained in the resin component in the rubber composition.

In the rubber composition of the present invention, the content of the SiH group-containing compound [B] having two SiH groups in one molecule is preferably in the range of 2 to 15 parts by weight, more preferably 3 to 8 parts by weight, based on 100 parts by weight of the ethylene/α-olefin/non-conjugated polyene copolymer [A], from the viewpoint of, for example, rubber hardness of the obtainable molded product, etc.

If the SiH group-containing compound [B] having two SiH groups in one molecule is added alone to the ethylene/α-olefin/non-conjugated polyene copolymer [A], the obtainable rubber composition can suppress crosslink density to a certain extent, and the obtainable molded product has excellent elongation properties. However, this composition has high compression set at a low temperature (−30° C.) and is poor in recovery properties, and thus there is yet room for improvement in these respects.

[C] SiH Group-Containing Compound Having Three SiH Groups in One Molecule

The SiH group-containing compound [C] having three SiH groups in one molecule for use in the present invention is a compound represented by the following general formula [III].

[III]

In the general formula [III], each $R^5$ is a monovalent group of 1 to 10 carbon atoms, is an unsubstituted or substituted saturated hydrocarbon group or an aromatic hydrocarbon group and may be the same or different in one molecule, a, b and c are each independently an integer of 0 to 20, and $R^6$ is a trivalent organic group of 1 to 30 carbon atoms.

The SiH group-containing compound [C] has three SiH groups at three ends of a molecule and has three SiH groups in one molecule. Examples of $R^5$ in the general formula [III] are the same as those of $R^3$ in the general formula [II], and there may be specifically mentioned, for example, methyl group, ethyl group, propyl group, isopropyl group, butyl group, amyl group, cyclopentyl group, hexyl group, cyclohexyl group, octyl group, chloromethyl group, 2-chloroethyl group, 3-chloropropyl group, phenyl group, phenylmethyl group, 2-phenylethyl group and 2-phenylpropyl group. Preferable are methyl group, ethyl group and phenyl group. a, b and c are each independently an integer of 0 to 20, and a, b and c are each preferably not more than 10, more preferably not more than 5, particularly preferably not more than 2, and it is most preferable that a, b and c are equal to one another and are each not more than 2. $R^6$ in the general formula [III] is a trivalent organic group having 1 to 30 carbon atoms, preferably a trivalent organic group having 1 to 30 carbon atoms and containing silicon.

Particularly preferable examples of the SiH group-containing compounds [C] having three SiH groups in one molecule include a compound represented by the following formula [III-1].

[III-1]

In the rubber composition of the present invention, the content of the SiH group-containing compound [C] having three SiH groups in one molecule is preferably in the range of 0.1 to 2 parts by weight, more preferably 0.3 to 1.4 parts by weight, based on 100 parts by weight of the ethylene/α-olefin/non-conjugated polyene copolymer [A].

The SiH group-containing compound [C] having three SiH groups in one molecule is added alone to the ethylene/α-olefin/non-conjugated polyene copolymer [A], the resulting rubber composition undergoes three-dimensional crosslinking and is enhanced in rubber properties such as mechanical strength. However, this rubber composition has poor recovery properties, tends to cause scorching and has poor handleability during molding. Thus, this rubber composition exhibits unsuitable properties for use in a fuel cell sealing member, a gasket member for LIM molding, a sealing member for an electric wire connector, etc.

On the other hand, in the rubber composition of the present invention, the SiH group-containing compound [B] having two SiH groups in one molecule and the SiH group-containing compound [C] having three SiH groups in one molecule are added in combination to the ethylene/α-olefin/non-conjugated polyene copolymer [A] and the rubber composition has: good moldability; excellent heat resistance, barrier properties and sealing properties; low compression set at a high temperature (150° C.) and a low temperature (−30° C.); and excellent recovery properties. Therefore, the rubber composition can be favorably used for a fuel cell sealing member, a gasket member for LIM molding, a sealing member for an electric wire connector, etc.

Rubber Composition

The rubber composition of the present invention contains, as essential components, the ethylene/α-olefin/non-conjugated polyene copolymer [A], the SiH group-containing compound [B] having two SiH groups in one molecule and the SiH group-containing compound [C] having three SiH groups in one molecule, and if necessary, further contains an organopolysiloxane and the later-described catalyst, reaction inhibitor and other components.

Preparation of Rubber Composition

The rubber composition of the present invention may be prepared by, for example, the following process. The copolymer [A] and if necessary an organopolysiloxane are kneaded together with other components, such as a rubber reinforcing agent, an inorganic filler and a softener, at a temperature of preferably 50 to 180° C. for 3 to 10 minutes using an internal mixer (closed mixing machine), such as a Banbury mixer, a kneader, a planetary mixer or an intermix, or a kneading device, such as a two-roll mill or a three-roll mill. Thereafter, the SiH group-containing compounds [B] and [C] and if necessary a catalyst, a reaction inhibitor, a vulcanization accelerator and a crosslinking assistant described later are added and kneaded using a roll, such as an open roll, or a kneader at a roll temperature of not higher than 100° C. for 1 to 30 minutes, followed by sheeting.

When the kneading is performed at low temperature using an internal mixer, all of the components for the rubber composition may be mixed at the same time and kneaded.

Crosslinking Method

Catalyst

In the case where crosslinking is carried out using the SiH group-containing compounds [B] and [C] in the preparation of the rubber composition of the present invention, a catalyst used for the crosslinking is an addition reaction catalyst, and it accelerates addition reaction (e.g., hydrosilylation reaction of alkene) of an alkenyl group or the like of the copolymer [A], and an organopolysiloxane that is used when needed, with a SiH group of the SiH group-containing compounds [B] and [C].

The catalyst usually used is, for example, an addition reaction catalyst comprising a platinum group element, such as a platinum-based catalyst, a palladium-based catalyst or a rhodium-based catalyst, and in the present invention, a platinum-based catalyst is preferable. It is desirable to use a complex comprising a group 8 element metal of the periodic table, such as a platinum-based catalyst, particularly preferably a complex obtained from platinum and a compound containing a vinyl group and/or a carbonyl group.

The compound containing a carbonyl group is preferably a carbonyl compound, an octanal compound or the like. Examples of the complexes of the compounds and platinum include a platinum-carbonyl complex, a platinum-octanal complex, a platinum-carbonylbutylcyclosiloxane complex and a platinum-carbonylphenylcyclosiloxane complex.

The compound containing a vinyl group is preferably a vinyl group-containing organosiloxane. Examples of the complexes of the compounds and platinum include a platinum-divinyltetramethyldisiloxane complex, a platinum-divinyltetraethyldisiloxane complex, a platinum-divinyltetrapropyldisiloxane complex, a platinum-divinyltetrabutyldisiloxane complex and a platinum-divinyltetraphenyldisiloxane complex.

Of the vinyl group-containing organosiloxanes, a vinyl group-containing cyclic organosiloxane is preferable. Examples of the complexes of the compounds and platinum include a platinum-vinylmethylcyclosiloxane complex, a platinum-vinylethylcyclosiloxane complex and a platinum-vinylpropylcyclosiloxane complex.

The vinyl group-containing organosiloxane itself may be used for a ligand to a metal, and besides, it may be used as a solvent for coordinating other ligands. Particularly preferred as a catalyst is a complex with a ligand derived from the aforesaid carbonyl group-containing compound, which complex is obtained in the presence of the vinyl group-containing organosiloxane as a solvent.

Examples of the complexes include a vinylmethylcyclosiloxane solution of a platinum-carbonyl complex, a vinylethylcyclosiloxane solution of a platinum-carbonyl complex, a vinylpropylcyclosiloxane solution of a platinum-carbonyl complex, a divinyltetramethyldisiloxane solution of a platinum-carbonyl complex, a divinyltetraethyldisiloxane solution of a platinum-carbonyl complex, a divinyltetrapropyldisiloxane solution of a platinum-carbonyl complex, a divinyltetrabutyldisiloxane solution of a platinum-carbonyl complex, and a divinyltetraphenyldisiloxane solution of a platinum-carbonyl complex.

The catalysts comprising these complexes may further contain components other than the compound containing a vinyl group and/or a carbonyl group. For example, the catalysts may contain a solvent other than the compound containing a vinyl group and/or a carbonyl group. Examples of such solvents include various alcohols and xylene, though the solvents are not limited thereto.

Examples of the alcohols include aliphatic saturated alcohols, such as methanol and ethanol; aliphatic unsaturated alcohols, such as allyl alcohol and crotyl alcohol; alicyclic alcohols, such as cyclopentanol and cyclohexanol; aromatic alcohols, such as benzyl alcohol and cinnamyl alcohol; and heterocyclic alcohols, such as furfuryl alcohol.

The catalyst containing an alcohol as a solvent is, for example, a platinum-octanal/octanol complex. The catalyst containing such a solvent has advantages in that, for example, handling of the catalyst and mixing of the catalyst with the rubber composition are facilitated.

Of the above-mentioned various catalysts, preferable are a vinylmethylcyclosiloxane solution of a platinum-carbonyl complex (particularly preferable is a complex represented by the following chemical formula 1), a platinum-vinylmethylcyclosiloxane complex (particularly preferable is a complex represented by the following chemical formula 2), a platinum-divinyltetramethyldisiloxane complex (particularly preferable is a complex represented by the following chemical formula 3), a platinum-octanal/octanol complex, and the like, from the viewpoint of practical use. Of these, particularly preferable is a platinum-carbonylvinylmethylcyclosiloxane complex.

Pt$^0$.CO.(CH$_2$=CH(Me)SiO)$_4$  Chemical formula 1

Pt$^0$.(CH$_2$=CH(Me)SiO)$_4$  Chemical formula 2

Pt$^0$-1.5[(CH$_2$=CH(Me)$_2$Si)$_2$O]  Chemical formula 3

The proportion of the periodic table group 8 element metal (preferably platinum) contained in these catalysts is in the range of usually 0.1 to 10% by weight, preferably 0.1 to 5% by weight, more preferably 0.1 to 4% by weight, particularly preferably 0.1 to 3.5% by weight.

The catalyst is used in an amount of 0.1 to 100,000 ppm by weight, preferably 0.1 to 10,000 ppm by weight, more preferably 0.1 to 5,000 ppm by weight, particularly preferably 0.1 to 1,000 ppm by weight, based on the total amount of the copolymer [A] and the organopolysiloxane that is added when needed, though the amount of the catalyst is not specifically restricted. Use of the catalyst in an amount in the above range gives a rubber composition capable of forming a crosslinked rubber molded product which has moderate crosslink density and is excellent in strength properties and elongation properties. Use of the catalyst in an amount exceeding 100,000 ppm by weight is undesirable because of disadvantageous cost. The crosslinked rubber molded product may be also obtained by irradiating an uncrosslinked rubber molded product of the rubber composition containing no catalyst with light, γ-rays, electron beams or the like.

In the crosslinking of the rubber composition of the present invention, both of addition crosslinking and radical crosslinking may be carried out by using an organic peroxide in addition to the above catalyst. The organic peroxide is used in an amount of about 0.1 to 10 parts by weight based on 100 parts by weight of the total of the copolymer [A] and the organopolysiloxane that is added when needed. As the organic peroxide, a hitherto publicly known organic peroxide that is usually used for crosslinking of rubbers is employable.

Reaction Inhibitor

In the crosslinking, a reaction inhibitor is preferably used together with the above catalyst. Examples of the reaction inhibitors include benzotriazole, ethynyl group-containing alcohols, such as ethynylcyclohexanol, acrylonitrile, amide compounds, such as N,N-diallylacetamide, N,N-diallylbenzamide, N,N,N',N'-tetraallyl-o-phthalic acid diamide, N,N,N',N'-tetraallyl-m-phthalic acid diamide and N,N,N',N'-tetraallyl-p-phthalic acid diamide, sulfur, phosphorus, nitrogen, amine compounds, sulfur compounds, phosphorus compounds, tin, tin compounds, tetramethyltetravinylcyclotetrasiloxane, and organic peroxides, such as hydroperoxide.

The reaction inhibitor is used in an amount of 0 to 50 parts by weight, usually 0.0001 to 50 parts by weight, preferably 0.0001 to 30 parts by weight, more preferably 0.0001 to 20 parts by weight, still more preferably 0.0001 to 10 parts by weight, particularly preferably 0.0001 to 5 parts by weight, based on 100 parts by weight of the total of the copolymer [A] and the organopolysiloxane that is added when needed. Use of the reaction inhibitor in an amount exceeding 50 parts by weight is undesirable because of disadvantageous cost.

Other Components

To the rubber composition of the present invention, hitherto publicly known additives, such as rubber reinforcing agent, inorganic filler, softener, anti-aging agent, processing aid, vulcanization accelerator, organic peroxide, crosslinking assistant, foaming agent, foaming assistant, colorant, dispersing agent and flame retardant, can be added according to the intended use of the crosslinked product, within limits not detrimental to the objects of the present invention. These additives are described below in detail by taking typical examples of fillers and compounding ingredients.

(i) Rubber Reinforcing Agent

The rubber reinforcing agent has an effect of enhancing mechanical properties of a crosslinked (vulcanized) rubber, such as tensile strength, tear strength and abrasion resistance. Examples of the rubber reinforcing agents include carbon black, such as SRF, GPF, FEF, HAF, ISAF, SAF, FT and MT, carbon black obtained by surface-treating these carbon black with a silane coupling agent or the like, finely divided silicic acid, and silica.

Even if use of the rubber reinforcing agent such as carbon black is omitted in the rubber composition of the present invention, a rubber composition capable of providing sealing members having excellent strength and sealing properties is obtained. However, the addition of the rubber reinforcing agent such as carbon black, further improves the strength. When carbon black is used as the rubber reinforcing agent, the amount of the carbon black used is desired to be in the range of 1 to 300 parts by weight, preferably 1 to 200 parts by weight, more preferably 1 to 100 parts by weight, particularly preferably 1 to 50 parts by weight, most preferably 10 to 50 parts by weight, based on 100 parts by weight of the total of the copolymer [A] and the organopolysiloxane that is added when needed. In the composition of the present invention, the preferred electrical insulation properties can be maintained even if carbon black is added to the composition.

Examples of silica include fumed silica and precipitated silica. The silica may have been surface-treated with, for example, reactive silane, such as hexamethyldisilazane, chlorosilane or alkoxysilane, or low-molecular weight siloxane. The specific surface area (BET method) of the silica is preferably not less than 10 $m^2/g$, more preferably 30 to 500 $m^2/g$.

Carbon blacks preferably used in the present invention have an adsorbed amount of iodine of not more than 80 mg/g, preferably 15 to 40 mg/g, an average particle diameter of not more than 250 nm, preferably 40 to 100 nm, and an absorbed amount of DBP of 10 to 300 $cm^3/100$ g, preferably 40 to 150 $cm^3/100$ g. For example, carbon black of FEF grade, GPF grade, SRF grade, or other grades are preferably used. In the case where such carbon black is used, it is preferable to use the carbon black in combination with surface-modified precipitated silica (hydrous silicic acid) having a BET specific surface area (i.e., indication of primary particle diameter) of 30 to 80 $m^2/g$, preferably 40 to 60 $m^2/g$, and a particle diameter measured by the Coulter counter method (i.e., indication of secondary particle diameter), of 1 to 4 μm, preferably 1.5 to 3 μm, from the viewpoint that a molded product having a low compression set in high-temperature environment and having excellent recovery properties is obtained.

Although the kind and the amount of the rubber reinforcing agent may be properly selected according to the use purpose, the maximum amount of the rubber reinforcing agent added is usually 300 parts by weight, preferably 200 parts by weight, based on 100 parts by weight of the total of the ethylene/α-olefin/non-conjugated polyene copolymer [A] and the organopolysiloxane that is added when needed. The rubber reinforcing agents may be used singly or in combination of two or more kinds.

(ii) Inorganic Filler

Examples of the inorganic fillers include light calcium carbonate, heavy calcium carbonate, talc, clay and diatomaceous earth. These inorganic fillers may be used singly or in combination of two or more kinds. Although the kind and the amount of the inorganic filler added may be properly selected according to the use purpose, the amount of the inorganic filler added is usually from 1 part by weight up to 300 parts by weight, preferably up to 200 parts by weight, based on 100 parts by weight of the total of the copolymer [A] and the organopolysiloxane that is added when needed.

(iii) Softener

As the softener, a publicly known softener usually used for rubbers is employable. Examples of such softeners include petroleum-based softeners, such as process oil, lubricating oil, paraffin, liquid paraffin, petroleum asphalt and vaseline; coal tar-based softeners, such as coal tar and coal tar pitch; fatty oil-based softeners, such as castor oil, linseed oil, rapeseed oil and coconut oil; waxes, such as beeswax, carnauba wax and lanolin; fatty acids and fatty acid salts, such as ricinolic acid, palmitic acid, barium stearate, calcium stearate and zinc laurate; synthetic polymers, such as petroleum resin, atactic polypropylene and coumarone-indene resin; and other softeners, such as tall oil and factice. Of these, petroleum-based softeners are preferably used, and process oil is particularly preferably used. The amount of the softener added is properly selected according to the use purpose of the crosslinked product. These softeners may be used singly or in combination of two or more kinds.

(iv) Anti-Aging Agent

As the anti-aging agent, any of hitherto publicly known anti-aging agents is employable, and examples thereof include amine-based anti-aging agents, hindered phenol-based anti-aging agents and sulfur-based anti-aging agents. The anti-aging agent is used in such an amount that the objects of the present invention are not impaired. The anti-aging agents given below as examples may be used singly or in combination of two or more kinds even in the same kind or different kinds of the amine-based anti-aging agents, the hindered phenol-based anti-aging agents and the sulfur-based anti-aging agents.

Examples of the amine-based anti-aging agents include diphenylamines and phenylenediamines. In particular, 4,4'-(α,α-dimethylbenzyl)diphenylamine and N,N'-di-2-naphthyl-p-phenylenediamine are preferable.

As the hindered phenol-based anti-aging agents, phenolic compounds, such as tetrakis[methylene-3-(3',5'-di-t-butyl-4'-hydroxyphenyl)propionate]methane and 3,9-bis[2-{3-(3-t-butyl-4-hydroxy-5-methylphenyl)propionyloxy}-1,1-dimethylethyl]-2,4,8,10-tetraoxaspiro[5,5]undecane are particularly preferable.

As the sulfur-based anti-aging agents, 2-mercaptobenzimidazole, zinc salt of 2-mercaptobenzimdazole, 2-mercaptomethylbenzimidazole, zinc salt of 2-mercaptomethylbenzimidazole, and pentaerythritol-tetrakis-(β-laurylthiopropionate) are particularly preferable.

(v) Processing Aid

As the processing aid, a publicly known compound that is usually used for processing rubbers is employable. Examples of such processing aids include higher fatty acids, such as ricinolic acid, stearic acid, palmitic acid and lauric acid; salts of high fatty acids, such as barium stearate, zinc stearate and calcium stearate; and esters of higher fatty acids such as ricinolic acid, stearic acid, palmitic acid and lauric acid. The processing aid is used in an amount of not more than 10 parts by weight, preferably not more than 5 parts by weight, based on 100 parts by weight of the total of the copolymer [A] and the organopolysiloxane that is added when needed. However, it is desirable to properly determine the optimum amount according to the property values required.

(vi) Crosslinking Assistant

When an organic peroxide is used in the crosslinking of the rubber composition of the present invention, a crosslinking assistant is preferably used in combination with the organic peroxide. Examples of the crosslinking assistants include sulfur, quinone dioxime-based compounds, such as p-quinone dioxime, methacrylate-based compounds, such as polyethylene glycol dimethacrylate, allyl-based compounds, such as diallyl phthalate and triallyl cyanurate, maleimide-based compounds, and divinylbenzene. Such a crosslinking assistant is used in an amount of 0.5 to 2 mol based on 1 mol of the organic peroxide used, preferably in an amount nearly equimolar to the organic peroxide.

(vii) Other Resin Components

In the rubber composition of the present invention, publicly known other rubbers may be used as other resin components within limits not detrimental to the objects of the present invention. Examples of such rubbers include natural rubbers (NR), isoprene-based rubbers, such as isoprene rubber (IR), and conjugated diene-based rubbers, such as butadiene rubber (BR), styrene-butadiene rubber (SBR), acrylonitrile-butadiene rubber (NBR) and chloroprene rubber (CR).

Moreover, hitherto publicly known ethylene/α-olefin-based copolymer rubbers, such as an ethylene/propylene random copolymer (EPR), may be used, or as an ethylene/α-olefin/non-conjugated polyene copolymer other than the copolymer [A] of the present invention, an ethylene/propylene/non-conjugated diene copolymer (EPDM) may be used.

Fuel Cell Sealing Member, Hard Disk Drive Top Cover Gasket, Sealing Member for Electric Wire Connector Molding and Crosslinking Method Since the rubber composition of the present invention described above is excellent not only in mechanical properties but also in heat resistance, it can be particularly favorably used for a fuel cell sealing member, a hard disk drive top cover gasket, a sealing member for an electric wire connector, etc. The rubber composition of the present invention is particularly suitable for LIM molding, but molded products of the rubber composition may be also produced by other molding methods.

The fuel cell sealing member, the hard disk drive top cover gasket and the sealing member for an electric wire connector of the present invention (referred to as "respective members of the present invention" hereinafter) can exhibit their characteristics most markedly when they are used as crosslinked rubber molded products.

In the production of a crosslinked rubber molded product from the rubber composition of the present invention, it is preferable that an uncrosslinked rubber composition is first prepared by the aforesaid preparation process, then the rubber composition is molded into the intended shape, and the molded product is crosslinked, similarly to the case where general rubbers are usually vulcanized (crosslinked).

The rubber composition of the present invention prepared as above is molded into the intended shapes by various molding methods using an LIM molding machine, an injection molding machine, a transfer molding machine, a press molding machine, an extrusion molding machine, a calender roll, an ink jet forming machine, a screen printing machine and the like. Of these molding machines, the LIM molding machine is preferable for producing the desired respective members of the present invention from the viewpoints of thickness accuracy and high-speed molding. Moreover, injection molding and compression molding are also preferable.

The crosslinking may be carried out simultaneously with molding of the rubber composition, or may be carried out by introducing the molded product into a vulcanizing bath.

For example, molding and crosslinking may be carried out in the following manner. The rubber composition of the present invention is obtained by mixing the components using any of various kneading devices, such as a three-mill roll, an open roll, a two-open roll, a Banbury mixer, an internal mixer, a kneader, a planetary mixer and a high-shear mixer. The rubber composition is then molded under the crosslinking conditions of 80 to 230° C., preferably 100 to 180° C., and then, if necessary, the resulting crosslinked molded product is subjected to heat treatment (secondary vulcanization) in an air oven, such as a gear oven or an incubator, at about 100 to 230° C., preferably about 120 to 150° C., for about 0.5 to 24 hours. The crosslinking or the secondary crosslinking (secondary vulcanization) may be carried out by irradiation with light, γ-rays, electron beams or the like, and the crosslinking may be carried out at ordinary temperature. Through the above process, crosslinked rubber molded products, namely the respective members of the present invention, are obtained.

In this crosslinking step, the crosslinking may be carried out with or without a mold. When a mold is not used, the steps of molding and crosslinking are usually carried out continuously. Usable heating means in the vulcanizing bath include a heating bath using hot air, glass bead fluidized bed, UHF (ultra-high frequency electromagnetic waves), and steam.

LIM Molding

In the case where the rubber composition of the present invention is applied particularly to LIM molding, it is preferable that preparation of a composition containing the copolymer [A] and the SiH group-containing compounds [B] and [C] and that of a composition containing the copolymer [A] and the catalyst are carried out and these two compositions are then mixed in an LIM molding device to prepare and mold the rubber composition of the present invention.

That is to say, the copolymer [A], additives, such as other resin components, a rubber reinforcing agent, an inorganic filler and a softener, and the SiH group-containing compounds [B] and [C] are kneaded for 3 to 10 minutes by the use of an internal mixer (closed mixing machine), such as a Banbury mixer, a kneader or an intermix, or a mixing machine, such as a planetary mixer, to prepare a liquid rubber composition (1), with the proviso that the kneading machine used is properly selected according to the viscosity of the materials and the like. Separately, the copolymer [A], additives, such as other resin components, a rubber reinforcing agent, an inorganic filler and a softener, the catalyst, and if necessary, a reaction inhibitor are kneaded for 3 to 10 minutes to prepare a liquid rubber composition (2). Defoaming is carried out, when needed. Subsequently, the liquid rubber composition (1) and the liquid rubber composition (2) are placed in an exclusive pail can that can be directly connected to an LIM molding device or a cartridge that can be directly connected to an LIM molding device, then allowed to pass through a metering device and a mixing device, and subjected to LIM molding to obtain the respective members of the present invention.

Fuel Cell Sealing Member

For fuel cells, it is important to seal a cell, and this seal needs to be excellent particularly in gas barrier properties and the like. An example of the shape of the seal is described with reference to the drawings.

Figure 1:
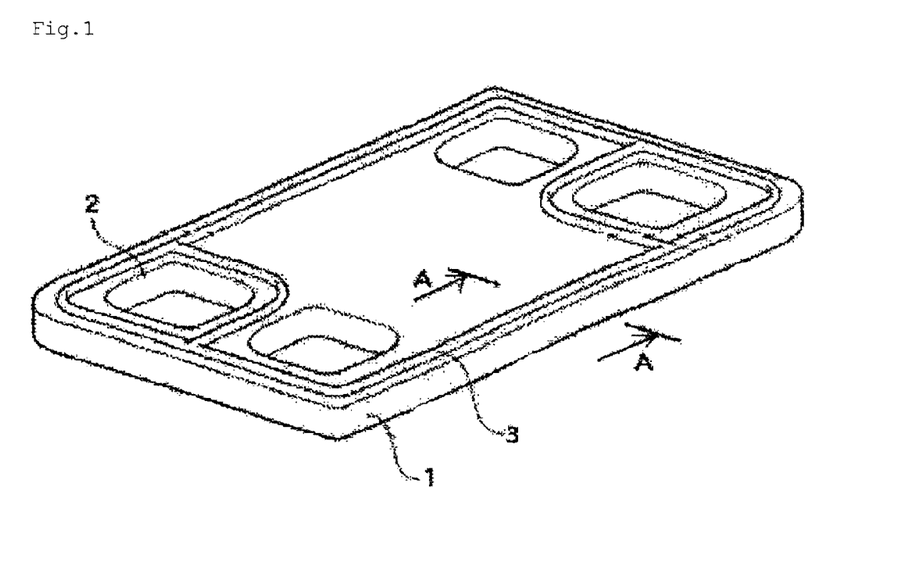
FIG. 1 is a perspective view showing an example of a separator-integrated cell seal part for a fuel cell.
Figure 2:
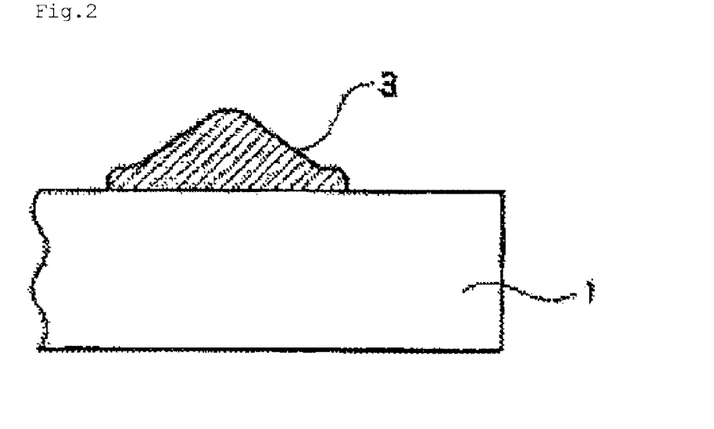
FIG. 2 is a schematic cross-sectional view taken on line A-A in FIG. 1

The sealing member has, for example, such a shape as indicated by reference numeral 3 in FIG. 1 and FIG. 2. The sealing member has such a planar outer shape as indicated by reference numeral 3 in FIG. 1. In FIG. 1 and FIG. 2, reference numeral 1 indicates a carbon, metallic or resin separator, and reference numeral 3 indicates a sealing member. Reference numeral 2 in FIG. 1 indicates a space.

The fuel cell sealing member of the present invention preferably has no void caused by foaming or the like, that is, the fuel cell sealing member is preferably so-called void-free.

The fuel cell sealing member of the present invention desirably has a volume resistivity of not less than $1 \times 10^{10}$ Ω·cm. The volume resistivity is one of properties required for sealing members used in electrical or electronic parts, and is an indicator of electrical insulation properties. The volume resistivity is more preferably not less than $1 \times 10^{12}$ Ω·cm, and a sealing member having such a volume resistivity exhibits preferred performance as a sealing member. The volume resistivity is measured in accordance with SRIS2301-1969 using a sheet having a thickness of 1 mm obtained by press-crosslinking a rubber composition at a pressure of 40 kgf/cm$^2$ and a temperature of 150° C. for 10 minutes.

The fuel cell of the present invention comprises the fuel cell sealing member of the present invention.

Hard Disk Drive Top Cover Gasket

The hard disk drive top cover gasket of the present invention preferably comprises, at the gasket portion, a crosslinked rubber sheet obtained by the aforesaid method and having a compression set of not more than 50%, and such a gasket exhibits sufficient sealing properties as a manufactured article. Moreover, the crosslinked rubber sheet preferably has a tensile strength of not less than 2 MPa and a tensile elongation at break of not less than 200%, and in this case, troubles, for example the rubber sheet is easily torn off in the production process, is suppressed. Furthermore, the crosslinked rubber sheet preferably has a hardness (JIS K6253:1997) of less than 70 degrees. If the hardness is not less than 70 degrees, the reaction force given when the cover-integrated gasket is mounted on a main body is increased. As a result, the cover is deformed and sealing cannot be made completely, and thus, the sealing properties required for a gasket are sometimes deteriorated. The hardness is preferably not less than 10 degrees. If the hardness is less than 10 degrees, troubles that the gasket is easily torn off, easily adheres, etc. are brought about. The hardness is most preferably in the range of 20 to 40 degrees.

Examples of adhesives used for integrating the hard disk drive top cover with the gasket include epoxy resin-based adhesives, phenolic resin-based adhesives, isocyanate-based coupling agents and silane-based coupling agents. For applying the adhesive, an optimum method is selected from dip coating, spray coating, screen printing, brushing, stamping, etc. according to necessity.

The hard disk drive top cover gasket of the present invention preferably has no void caused by foaming or the like, that is, this gasket is preferably so-called void-free.

Sealing Member for Electric Wire Connector

The sealing member for an electric wire connector of the present invention comprises the aforesaid rubber composition of the present invention, and is preferably, for example, a solid polymer type (solid polymer electrolyte type) sealing member for an electric wire connector.

The sealing member for an electric wire connector of the present invention preferably has a durometer A hardness (instantaneous), which indicates a surface hardness of the cured product layer, of not more than 45. The durometer A hardness (instantaneous) is an indicator of hardness and can be measured in accordance with JIS K6253:1997. A durometer A hardness (instantaneous) of not more than 45 can be obtained by variously controlling the proportions of various additives added to the composition, such as a reinforcing agent, a filler and a plasticizer, and a sealing member for an electric wire connector containing none of these additives also exhibits a desired low hardness. The lower limit of the hardness is not less than 5. If the hardness is less than the lower limit, the sealing member is too soft and exhibits poor performance for sealing the electric wire connector. However, a sealing member for an electric wire connector containing, as the reinforcing agent or the filler, a substance which acts as catalyst poison, such as sulfur or a halogen compound, is undesirable.

The electric wire connector of the present invention comprises the seal member for an electric wire connector of the present invention as above. The electric wire connector according to the present invention is particularly preferably an electric wire connector for automobiles.

EXAMPLES

The present invention is further described with reference to the following examples, but it should be construed that the present invention is in no way limited to those examples.

Preparation Example 1

Preparation of ethylene/propylene/5-vinyl-2-norbornene Random Copolymer (A-1)

Using a stainless steel polymerizer (stirring rotational speed: 250 rpm) having a substantial internal volume of 100 liters and equipped with a stirring blade, terpolymerization of ethylene, propylene and 5-vinyl-2-norbornene (abbreviated to VNB hereinafter) was continuously carried out. To the liquid phase in the polymerizer were continuously fed, at the side of the polymerizer, hexane at a rate of 60 l/hr, ethylene at a rate of 1.3 kg/hr, propylene at a rate of 2.5 kg/hr, VNB at a rate of 130 g/hr, hydrogen at a rate of 30 l/hr, $VO(OEt)Cl_2$ as a catalyst at a rate of 23 mmol/hr and $Al(Et)_{1.5}Cl_{1.5}$ as a catalyst at a rate of 161 mmol/hr, and copolymerization reaction was carried out under the conditions of a polymerization temperature of 40° C. and a polymerization pressure of 0.7 MPa to obtain an ethylene/propylene/VNB random copolymer (A-1) (referred to as a "copolymer (A-1)" hereinafter) in a state of a homogeneous solution. Thereafter, to the polymerization solution continuously drawn out from the bottom of the polymerizer was added a small amount of methanol to terminate the polymerization reaction. After the polymer was separated from the solvent by steam stripping treatment, the polymer was subjected to vacuum drying at 55° C. for 48 hours.

The resulting copolymer (A-1) had an ethylene content of 52.7% by weight, a VNB content of 4.7% by weight, an iodine value of 9.5 g/100 g, a complex viscosity (complex viscosity as measured by the use of a viscoelasticity measuring device MCR301 manufactured by Anton Paar (Australia)) at 25° C. of 1100 Pa·S, and an intrinsic viscosity [η], as measured in decalin at 135° C., of 0.28 dl/g. The values in composition of the copolymer (A-1) are those determined by measurement with $^{13}$C-NMR method.

Example 1

In a planetary mixer having a volume of 2 liters (manufactured by Inoue MFG., INC., trade name: PLM-2 model), 100 parts by weight of the copolymer (A-1) obtained in Preparation Example 1, 15 parts by weight of carbon black (Asahi #50HG available from Asahi Carbon Co., Ltd., amount of iodine adsorbed: 19 mg/g, average particle diameter: 85 nm, amount of DBP absorbed: 110 $cm^3$/100 g) and 30 parts by weight of surface-treated precipitated silica (Nip Seal SS-95 available from Tosoh Silica Corporation, BET specific surface area: 50 $m^2$/g, secondary particle diameter (average particle diameter as determined by the Coulter counter method): 2.4 μm, M value: 65) were kneaded at a temperature ranging from 50 to 80° C. Subsequently, to the resulting mixture were added 0.4 part by weight of a platinum-1,3,5,7-tetravinylmethylcyclosiloxane complex (platinum concentration: 0.5% by weight, vinyl-terminated siloxane oil solution) as a catalyst, 0.1 part by weight of 1-ethynyl-1-cyclohexanol as a reaction inhibitor, 4.8 parts by weight of a compound represented by the following formula [II-1] (referred to as a "crosslinking agent 1" hereinafter) as a crosslinking agent and 0.2 part by weight of a compound represented by the following formula [III-1] (referred to as a "crosslinking agent 2" hereinafter) as a crosslinking agent, and they were mixed to prepare a rubber composition. The M value of the surface-treated precipitated silica is a general indicator of the degree of modification treatment of silica, and is a value represented by a concentration of a methanol aqueous solution (% by volume of methanol) given when methanol aqueous solutions having different methanol concentrations are added to silica that is an M value evaluation target and the silica begins to have affinity (begins to become wet).

Subsequently, the resulting rubber composition was poured into a test sheet mold (140×100×2 mm) and compression molded at a hot plate preset temperature of 150° C. and a mold compression pressure of 80 MPa for 5 minutes to obtain a crosslinked rubber sheet. Then, secondary vulcanization was further carried out in an air oven at 150° C. for 1 hour to obtain a crosslinked rubber sheet.

Properties of the resulting crosslinked rubber sheet were measured or evaluated by the following methods. The results are set forth in Table 1.

(1) Hardness

In accordance with JIS K6253:1997, the A hardness was measured by a durometer method at a measuring temperature of 23° C.

(2) Tensile Test

In accordance with JIS K 6251, a tensile test was carried out under the conditions of a measuring temperature of 23° C. and a strain rate of 500 mm/min to measure a tensile strength at break and an elongation at break of the crosslinked sheet.

(3) Compression Set

In accordance with JIS K6262 (1997), three 2-mm sheets were laminated, and a compression set was measured to determine a compression set ratio. The measuring conditions are as follows. Measurement at high temperatures was carried out after high-temperature treatment under the conditions of 150° C.×70 hours. Measurement at low temperatures was carried out immediately after release of pressure following low-temperature treatment under the low-temperature conditions of −30° C., and after 30 minutes from the release, and after 1 hour from the release.

Example 2

A crosslinked rubber sheet was prepared and the properties of the crosslinked rubber sheet were evaluated in the same manner as in Example 1, except that the amount of the crosslinking agent 1 used was changed to 4.5 parts by weight and the amount of the crosslinking agent 2 used was changed to 0.5 part by weight. The results are set forth in Table 1.

Example 3

A crosslinked rubber sheet was prepared and the properties of the crosslinked rubber sheet were evaluated in the same manner as in Example 1, except that the amount of the crosslinking agent 1 used was changed to 4.0 parts by weight and the amount of the crosslinking agent 2 used was changed to 1.0 part by weight. The results are set forth in Table 1.

Comparative Example 1

A crosslinked rubber sheet was prepared and the properties of the crosslinked rubber sheet were evaluated in the same manner as in Example 1, except that the amount of the crosslinking agent 1 used was changed to 5.0 parts by weight and the crosslinking agent 2 was not used. The results are set forth in Table 1.

Example 4

In a planetary mixer having a volume of 2 liters (manufactured by Inoue MFG., INC., trade name: PLM-2 model), 100 parts by weight of the copolymer (A-1) obtained in Preparation Example 1, 10 parts by weight of carbon black (Asahi #50HG available from Asahi Carbon Co., Ltd., amount of iodine adsorbed: 19 mg/g, average particle diameter: 85 nm, amount of DBP absorbed: 110 cm$^3$/100 g) and 40 parts by weight of talc (L-1 available from Nippon Talc Co., Ltd., BET specific surface area: 11 m$^2$/g, secondary particle diameter: 4.9 μm) were kneaded. Subsequently, to the resulting mixture were added 0.4 part by weight of a platinum-1,3,5,7-tetravinylmethylcyclosiloxane complex (platinum concentration: 0.5% by weight, vinyl-terminated siloxane oil solution) as a catalyst, 0.1 part by weight of 1-ethynyl-1-cyclohexanol as a reaction inhibitor, 4.5 parts by weight of the crosslinking agent 1 and 0.5 part by weight of the crosslinking agent 2, and they were mixed to prepare a rubber composition. Then, a crosslinked rubber sheet was prepared and the properties of the crosslinked rubber sheet were evaluated in the same manner as in Example 1. The results are set forth in Table 1.

Comparative Example 2

A crosslinked rubber sheet was prepared and the properties of the crosslinked rubber sheet were evaluated in the same manner as in Example 4, except that the amount of the crosslinking agent 1 used was changed to 5.0 parts by weight and the crosslinking agent 2 was not used. The results are set forth in Table 1.

TABLE 1

|  | Precipitated silica-blend system | | | Talc-blend system | | |
|---|---|---|---|---|---|---|
|  | | | | Comparative | | Comparative |
|  | Example 1 | Example 2 | Example 3 | Example 1 | Example 4 | Example 2 |
| Crosslinking agent 1 | 4.8 | 4.5 | 4 | 5 | 4.5 | 5 |
| Crosslinking agent 2 | 0.2 | 0.5 | 1 |  | 0.5 |  |

TABLE 1-continued

| | Precipitated silica-blend system | | | Talc-blend system | | |
|---|---|---|---|---|---|---|
| | | | | Comparative | | Comparative |
| | Example 1 | Example 2 | Example 3 | Example 1 | Example 4 | Example 2 |
| 1,3,5,7-tetracinyl-1,3,5,7-tetramethylcyclotetrasiloxane platinum catalyst | 0.4 | 0.4 | 0.4 | 0.4 | 0.4 | 0.4 |
| 1-ethynyl-1-cyclohexanol | 0.1 | 0.1 | 0.1 | 0.1 | 0.1 | 0.1 |
| Values in ordinary state | | | | | | |
| Hardness durometer A hardness (instantaneous) | 43 | 45 | 47 | 39 | 42 | 38 |
| Tensile strength (MPa) | 4.3 | 4.2 | 4.3 | 4.2 | 2.7 | 2.7 |
| Elongation (%) | 390 | 360 | 360 | 480 | 300 | 450 |
| Compression set test (150° C., 70 hr) | | | | | | |
| Compression set ratio (%) | 15 | 15 | 14 | 16 | 20 | 28 |
| Low-temperature recovery properties (−30° C. low temperature CS (%)) | | | | | | |
| Immediately after release at −30° C. | 71 | 59 | 61 | 76 | 58 | 82 |
| After 30 minutes from release | 48 | 37 | 39 | 55 | 35 | 55 |
| After 1 hour from release | 43 | 32 | 34 | 49 | 30 | 49 |

From the results of the above examples and comparative examples, it can be seen that in Examples 2 and 3, the values in ordinary state and the compression set under the high-temperature conditions showed preferred properties, and besides, the elastic recovery ratio at a low temperature was good. Also in Example 1 in which the amount of the crosslinking agent 2 blended was small, a more improved elastic recovery ratio at a low temperature was observed than in Comparative Example 1 in which the crosslinking agent 2 was not blended. In Example 4 in which two kinds of the crosslinking agents were used in combination and talc was blended, the elastic recovery ratio particularly at a low temperature proved to be excellent. As for the values in ordinary state and the properties of compression set under the high-temperature conditions, Example 2 in which the same amount of SiH compound was used and surface-treated precipitated silica was blended was superior to Example 4.

INDUSTRIAL APPLICABILITY

The rubber composition of the present invention is suitable for LIM molding and is favorably used for a fuel cell sealing member, various gasket members such as a hard disk drive top cover gasket member, a sealing member for an electric wire connector, etc.

The invention claimed is:

1. A rubber composition comprising:
an ethylene/α-olefin/non-conjugated polyene copolymer [A] satisfying the following (a) to (e):
(a) said copolymer is a copolymer of ethylene, an α-olefin and a non-conjugated polyene,
(b) the α-olefin has 3 to 20 carbon atoms,
(c) the weight ratio of ethylene units to α-olefin units is in the range of 35/65 to 95/5,
(d) the iodine value is in the range of 0.5 to 50, and
(e) the intrinsic viscosity [η] is in the range of 0.01 to 5.0 dl/g as measured in decalin solution at 135° C.,
a SiH group-containing compound [B] represented by the following formula [II-1] and having only two SiH groups in one molecule, and
a SiH group-containing compound [C] represented by the following formula [III] and having only three SiH groups in one molecule;

[II-1]

[III]

wherein each $R^5$ is a monovalent group of 1 to 10 carbon atoms, is an unsubstituted or substituted saturated hydrocarbon group or an aromatic hydrocarbon group and may be the same or different in one molecule, a, b and c are each independently an integer of 0 to 20, and $R^6$ is a trivalent organic group of 1 to 30 carbon atoms.

2. The rubber composition as claimed in claim 1, wherein the ethylene/α-olefin/non-conjugated polyene copolymer [A] further satisfies the following (f):

(f) the non-conjugated polyene is at least one kind of norbornene compound represented by the following formula [I]:

wherein n is an integer of 0 to 10, $R^1$ is a hydrogen atom or an alkyl group of 1 to 10 carbon atoms, and $R^2$ is a hydrogen atom or an alkyl group of 1 to 5 carbon atoms.

3. The rubber composition as claimed in claim 1, wherein the SiH group-containing compound [C] having only three SiH groups in one molecule is contained in an amount of 0.1 to 2 parts by weight based on 100 parts by weigh of the ethylene/α-olefin/non-conjugated polyene copolymer [A].

4. The rubber composition as claimed in claim 1, wherein the SiH group-containing compound [C] having only three SiH groups in one molecule is a compound represented by the following formula [III-1]:

5. A fuel cell sealing member comprising the rubber composition as claimed in claim 1.

6. A fuel cell comprising a fuel cell sealing member comprising the rubber composition as claimed in claim 1.

7. A hard disk drive top cover gasket comprising the rubber composition as claimed in claim 1.

8. A gasket member for LIM molding, comprising the rubber composition as claimed in claim 1.

9. A hard disk drive comprising a hard disk drive top cover gasket comprising the rubber composition as claimed in claim 1.

10. A sealing member for an electric wire connector comprising the rubber composition as claimed in claim 1.

11. An electric wire connector comprising a sealing member for an electric wire connector comprising the rubber composition as claimed in claim 1.

12. The electric wire connector as claimed in claim 11, which is an electric wire connector for automobiles.

13. The rubber composition as claimed in claim 1, wherein the content of the SiH group-containing compound [B] having only two SiH groups in one molecule is in the range of 2 to 15 parts by weight based on 100 parts by weight of the ethylene/α-olefin/non-conjugated polyene copolymer [A].

14. The rubber composition as claimed in claim 1, wherein the SiH group-containing compound [B] having only two SiH groups in one molecule is contained in the rubber composition in such an amount as to give 0.2 to 10 hydrogen atoms bonded to silicon atoms based on one aliphatic unsaturated bond contained in the resin component in the rubber composition.

* * * * *